United States Patent
Aquino

(10) Patent No.: US 6,546,673 B2
(45) Date of Patent: Apr. 15, 2003

(54) AIRCRAFT CABIN AIR GRILLE HAVING ADAPTABLE AND POSITIVE ATTACHMENT MEANS

(75) Inventor: Roberto C. Aquino, Renton, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/928,702

(22) Filed: Aug. 7, 2001

(65) Prior Publication Data

US 2002/0100218 A1 Aug. 1, 2002

Related U.S. Application Data

(63) Continuation of application No. 09/228,698, filed on Jan. 12, 1999, now abandoned.

(51) Int. Cl.[7] .............................................. E05C 21/02
(52) U.S. Cl. ...................................................... 49/465
(58) Field of Search ................... 49/463, 465; 292/200, 292/204, 341.12

(56) References Cited

U.S. PATENT DOCUMENTS

| | | | | |
|---|---|---|---|---|
| 2,581,816 A | * | 1/1952 | Schlueter | 292/204 |
| 2,973,985 A | * | 3/1961 | Siegal | 292/204 |
| 4,099,511 A | * | 7/1978 | McIntire et al. | 49/465 |
| 4,106,236 A | * | 8/1978 | Oliphant | 49/141 |
| 4,270,311 A | * | 6/1981 | Palomar | 49/141 |
| 5,067,278 A | * | 11/1991 | Lyons | 49/463 |
| 5,110,235 A | * | 5/1992 | Thomann et al. | 404/4 |

* cited by examiner

Primary Examiner—Jerry Redman
(74) Attorney, Agent, or Firm—Conrad O. Gardner

(57) ABSTRACT

An aircraft air grille with adaptable and positive attachment means. The aircraft air grille utilizes two knurled surfaces to hold a panel in a desired location. The grille further comprises a spring cup for holding a lower edge of the grille.

3 Claims, 5 Drawing Sheets

AIRCRAFT CABIN AIR GRILLE HAVING ADAPTABLE AND POSITIVE ATTACHMENT MEANS

CROSS-REFERENCE TO RELATED APPLICATIONS

This is a continuation application of application Ser. No. 09/228,698, filed Jan. 12, 1999, now abandoned.

FIELD OF THE INVENTION

The invention relates to aircraft passenger cabin interiors having airflow panels that are easily installed and removed from the aircraft using adaptable and positive attachment means which extend between the floor and sidewall along both sides of the cabin. The air flow panel assemblies have air grilles for directing return air flow to the lower lobe. The airflow panel assemblies allow rapid flow of air in the event of aircraft rapid decompression.

BACKGROUND OF THE INVENTION

Prior Art

Exemplary prior art includes:
- U.S. Pat. No. 5,085,017 to Hararat-Tehrani showing a decompression panel being held in place by frangible mounting elements that break away in response to decompression loading. The breaking away occurs at a point on each mounting element where material has been removed to provide a weak spot.
- U.S. Pat. No. 5,069,401 to Shepherd et al. shows a fabric blowout panel that is hinged by the fabric along the upper edge and held into a U-shaped frame on the other three edges by friction due to bolting together of the frame sides.

None of the preceding prior art references show attachment means having a diamond-shape knurling engagement with mating panel clip providing a positive latch.

Commercial Aircraft

Commercial aircraft interiors have a number of air grille panels that extend between the floor and sidewall panel in an end-to-end manner running along both sides of the aircraft. The panels have air grilles for return air flow passage without conditioned air migration in the cabin and compound grille openings that allow rapid flow of air in the event of aircraft decompression.

BRIEF SUMMARY OF THE INVENTION

It is important that the air grille panels have the capability to be installed or removed while passenger seats are installed. Behind the air grilles are airplane system components needing occasional repair or maintenance access. Air grilles are also periodically removed from the aircraft for cleaning.

The Problem

It is highly desirable to be able to adjust the location of air grilles to aesthetically align them with sidewall panels prior to permanent fastening or latching. A further requirement is to have air grille panels secured to their supports without occurrence of any transposition during any flight conditions.

In many commercial passenger aircraft the air grille panels have fasteners to secure the ends into the rigid support brackets coupled to the body structures behind the panels while the upper and lower edges are unrestrained. In this means of attachment, fastener heads are usually exposed and exact lengths of grille panels are very meaningful to avoid misfits.

Various other ways of securing air grilles to capture the upper edge behind sidewall panels have diverse means of attaching the bottom edge onto the floor angle such as using clips, or quarter-turn latch systems, or swivel-clamping systems. This manner of captured panel upper edge and lower releasable latching means needs considerable space between the floor angle and passenger seat legs for preparatory motions to engage the upper edge and then setting the lower edge to latching position. Air grille panels in these numerous ways of bottom latching have overlapping ends.

The Solution

An aircraft interior air grille assembly comprised of three primary parts which when coupled onto the aircraft body structure on the floor and the interior sidewall panel will provide the air grille installation that is readily aligned and adjusted to the proper location. The first primary part is a molded thermoplastic air grille with molded features to provide easy positioning prior to positive latching. The second part is a releasable latch pawl that firmly holds the air grille assembly to the sidewall panel with a clockwise turn. The third part is a clip that holds the lower edge of the grille to the floor angle and another similar clip that interlocks the overlapping ends of the grille to the adjacent air grille. Assembly of these two basic parts to the grille panel does not need any other auxiliary hardware. A further advantage is the lack of exposed fasteners. The latch pawls are hidden and can be latched or released through access holes. A further advantage is the ability to assemble all components without any tool. The standard size air grille has a unique pattern that allows trimming to the desired sizes without partially cutting through grille areas thereby producing smaller air grilles without the expense of multiple numbers of injection molded tools.

Figure 2:
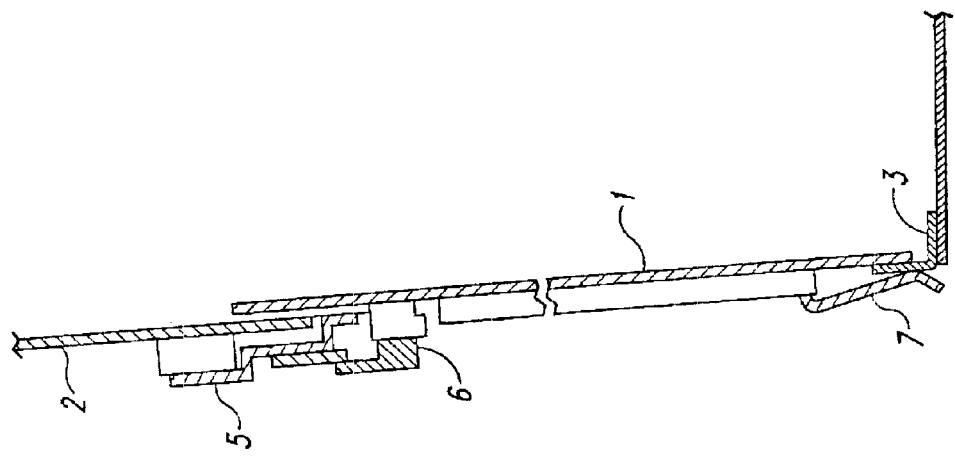
FIG. 2 is a cross sectional view of the interior air grille showing the latch pawl clamping the sidewall clip.

While the present invention is subject to various modifications and alternative forms, specific embodiments have been shown by way of example in the drawings and will be described in detail. It is not intended to limit the invention to the particular forms disclosed, but in the contrary, the intention is to cover all modifications, equivalents and alternatives falling within the scope of the invention.

DETAILED DESCRIPTION OF THE INVENTION

The present invention pertains to an aircraft having cabin interior sidewall panels and floor angles supporting the upper and lower portions of series air grilles. Each of the interior cabin air grilles has a lower edge retaining means, an upper edge retaining means, and an end retaining means. The lower edge retaining means includes the back surface of the air grille for resting against the floor angle and a clip means. The clip means is pivotally connected to the lower side of the grille frame and is biased in a manner to depress against the backside of the floor angle surface. The end retaining means includes the back surface of the air grille for overlapping over the end portion of the other air grille. The clip means is pivotally connected to the end side of the grille frame and is biased in a manner to depress against the back surface of the adjacent grille. This secured overlapping arrangement of air grilles produces an interlocking support system for the multiple air grilles. The latch means are operatively connected to the upper surface of the air grille for movement between the released horizontal position and the engaged vertical position. These latching and releasing operations are achieved through the air grille panel holes that provide access to the quarter-turn latching means.

Accordingly, a preferred embodiment of the present invention is to be able to secure the interior cabin air grilles in a very tight space between interior cabin sidewall panels and passenger seats. A further advantage is to be able to position the cabin air grille to the desired unlatched position but to have it immovable in the latched position. Another advantage is to assemble the air grille components without extra hardware and tools. Another desirable aspect is the hidden fastening means.

The present invention can thus be seen to pertain to an attachment means for the interior air grilles of an aircraft cabin and embodies the means of hiding fastening devices to hamper tampering and offer a desirable aesthetic appearance. This invention also includes the provision of being able to produce other sizes from the same customary size air grille.

Figure 1:
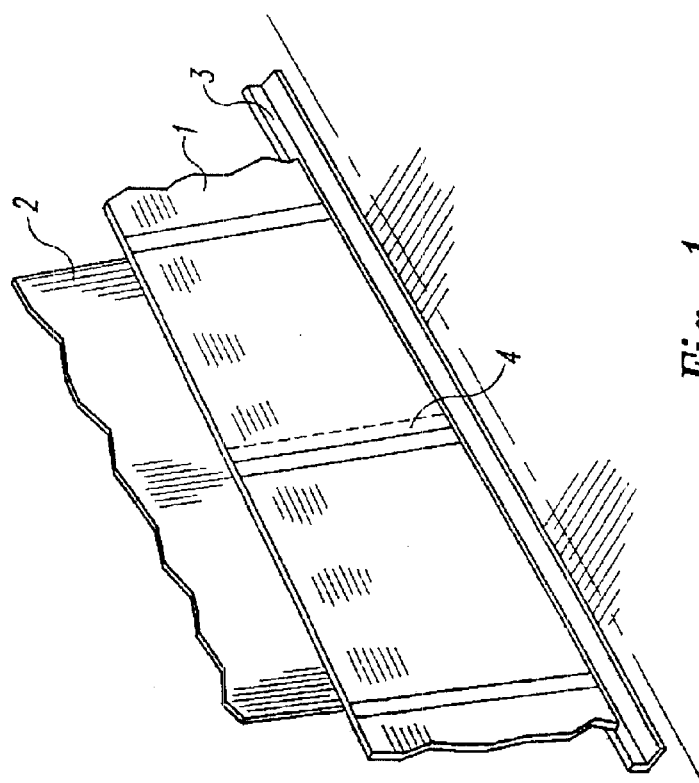
FIG. 1 is an isometric view of interior air grille panels for an aircraft cabin.

Referring to the figures of the drawings in more detail, first to FIG. 1, a cabin interior air grille panel assembly 1 is shown attached inboard of the sidewall panel 2 and the floor angle 3. The securing of the interior air grille 1 to the sidewall panel 2 and to the floor angle 3 is achieved by the mounting assembly shown clearly in FIGS. 2 and 3. The mounting assembly includes a lower spring clip 7, an end spring clip 8, and two upper latch pawls 6. Air grille panels are secured with panel overlap 4 by the end spring clip 8.

FIG. 2 shows the lower spring clip 7 engaged behind the lower support floor angle 2 which is running in lengthwise axis of the aircraft. The upper attachment is shown with the sidewall panel clip 5 which is secured to the sidewall panel 2 being clamped by upper latch pawl 6 mounted to the air grille 1.

Figure 3:
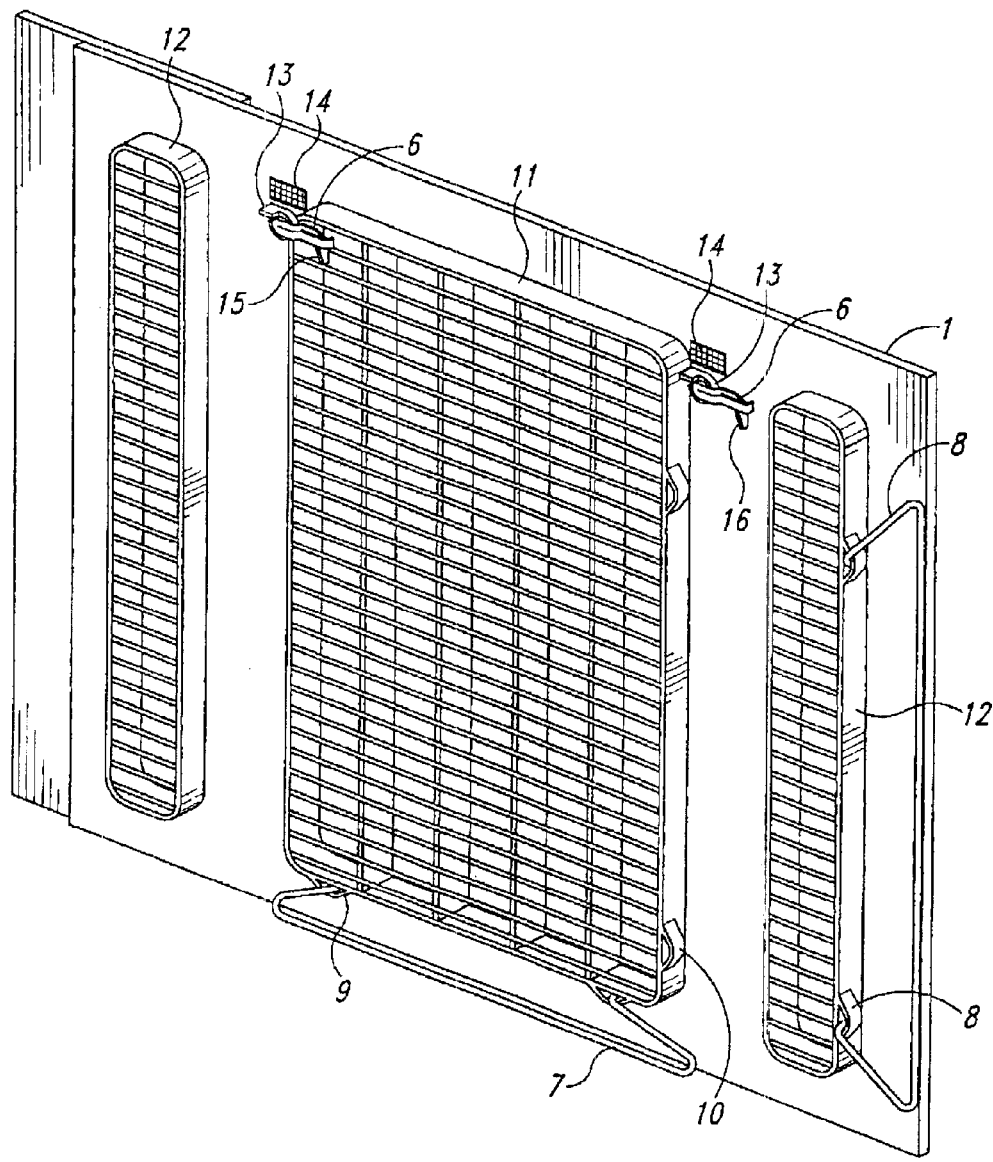
FIG. 3 is an isometric view of the standard size air grille assembly.
Figure 4:
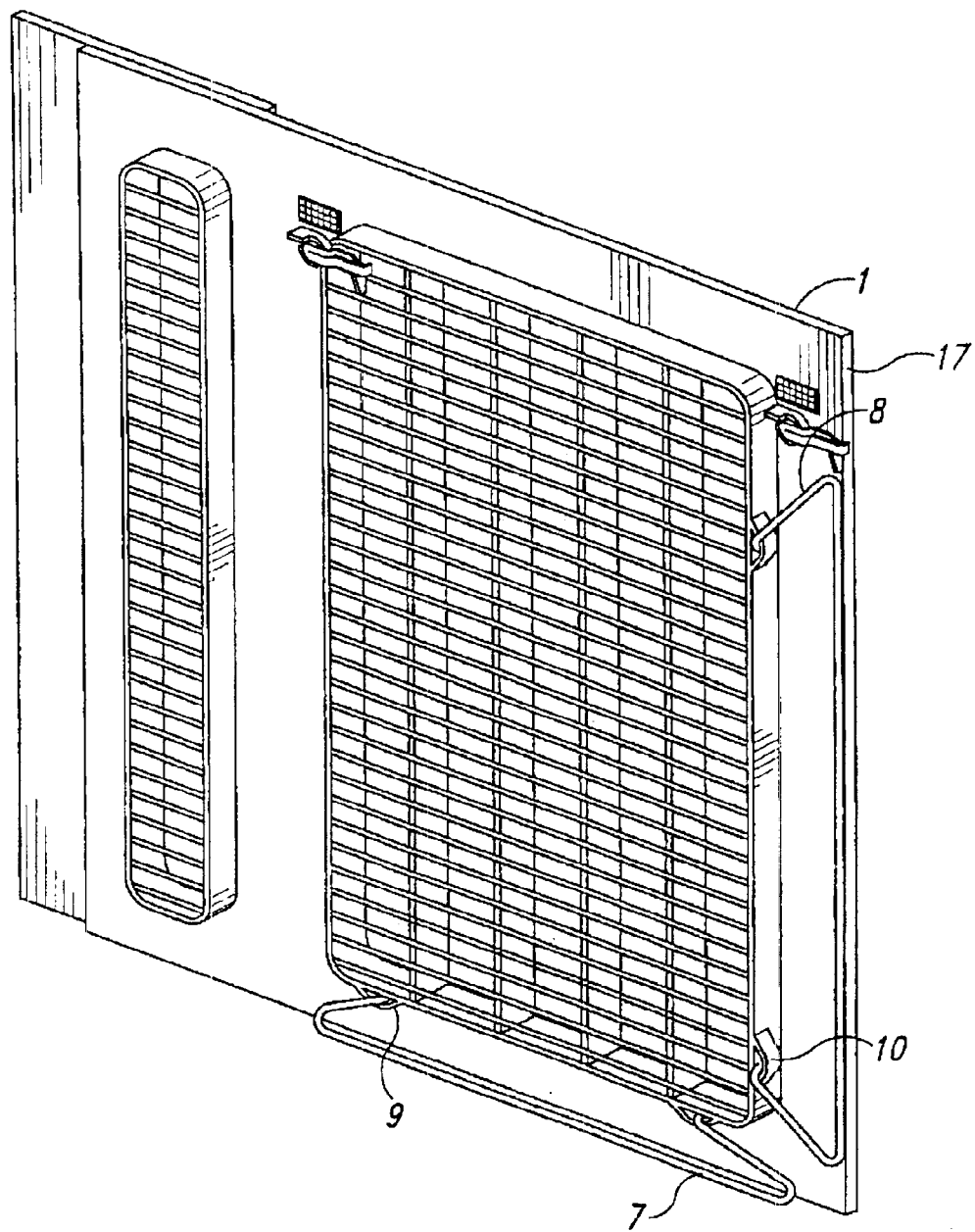
FIG. 4 is an isometric view of the smaller size air grille fabricated from the standard size assembly.

Referring to FIGS. 3 and 4, the air grille panel 1 is made from injection molded thermoplastic. Describing molded principal elements, the air grille panel 1 includes multitude grille openings embodied within large grille framework 11, multitude grille openings surrounded by two smaller end grille frameworks 12, latch hubs 13, deep, diamond-shape knurlings 14, latch released stops 15 and 16, and spring clip retainers 9 and 10. Smaller interior air grille 17 is made from larger air grille 1.

Figure 5:
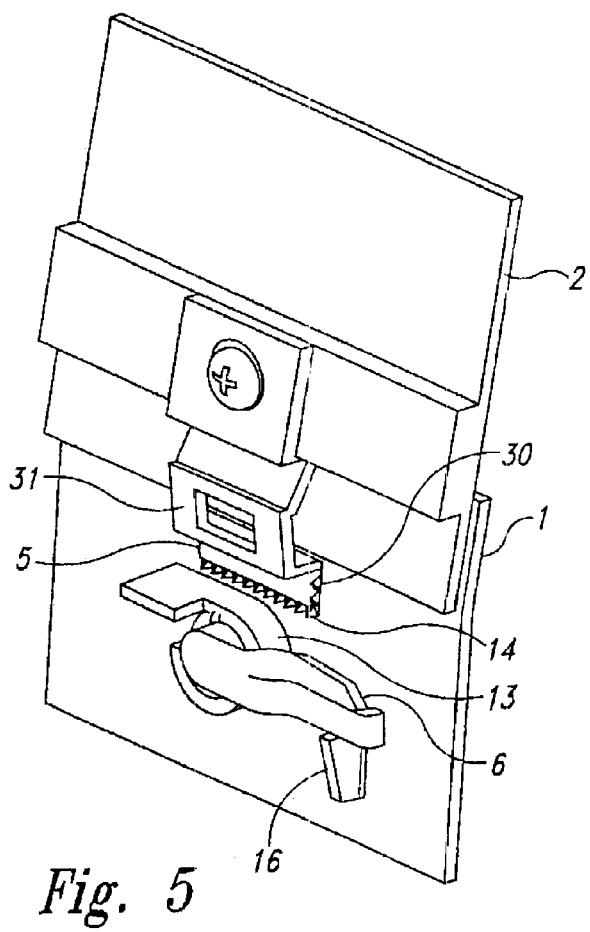
FIG. 5 is an isometric view showing the latch pawl in an assembled and released position.

FIG. 5 shows latch pawl 6 in the released position resting on released stop 16. In FIG. 3 the other latch pawl 6 is shown resting on released stop 15 in the released position.

Figure 6:
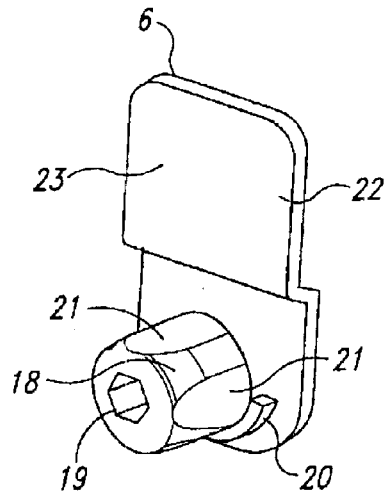
FIG. 6 is an isometric view of the latch pawl detail.
Figure 7:
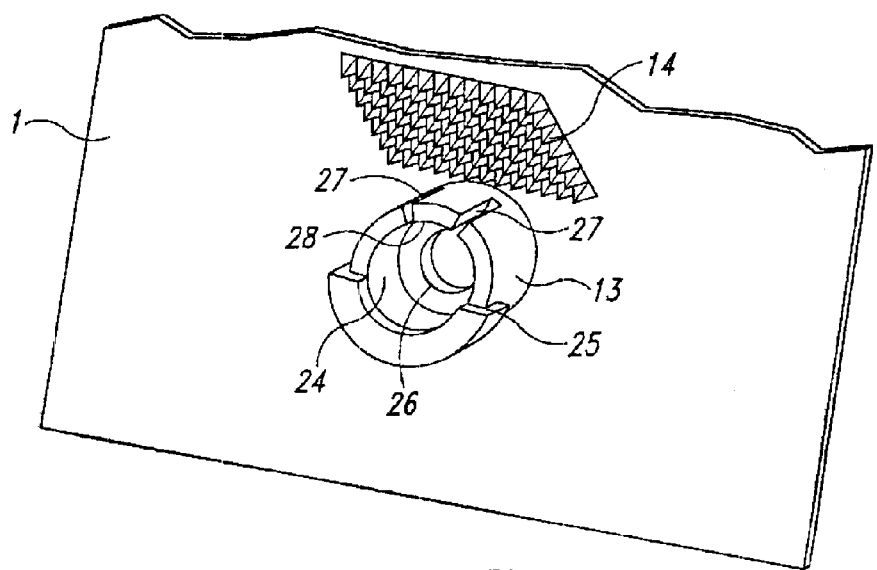
FIG. 7 is an isometric view of the latch retainer hub with diamond shape diagonal knurlings.
Figure 8:
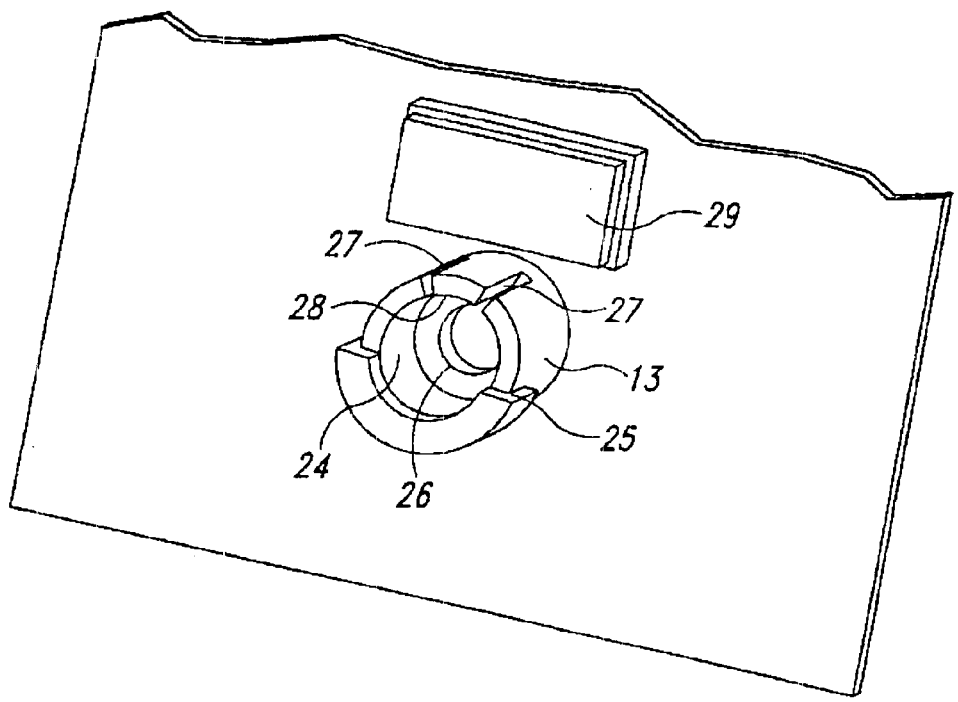
FIG. 8 is an isometric view of the latch retainer hub with rubber pad.
Figure 9:
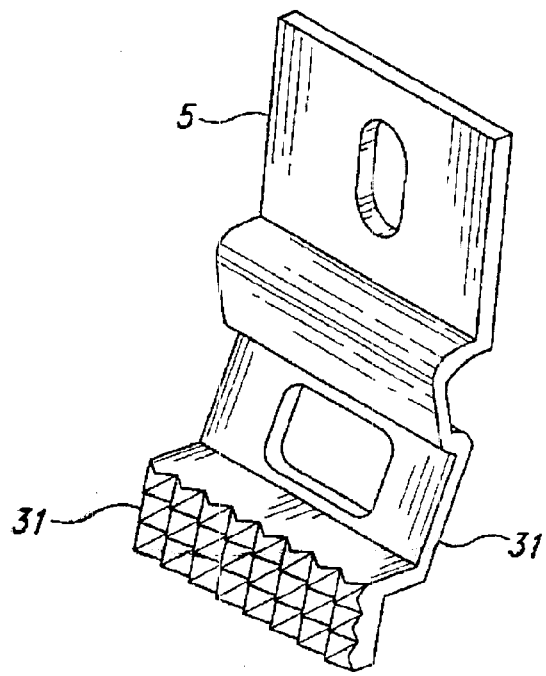
FIG. 9 is an isometric view of the sidewall clip.

Important elements in the present preferred embodiment of the invention are molded in features that are inherent in the latch pawl 6 and latch support hole 24 details. Molded detail features in latch pawl 6 are shown in FIG. 6, comprised of pawl shaft 18, pawl allen-shape hole 19, pawl crescent retainer 20, pawl quarter-turn detents 21, pawl ramp surface 22, and pawl latching surface 23. Moreover, referring to FIG. 7, molded segments in the support hole 24 are embodied with latch crescent retainer 25, pawl release hole 26, latch support notch 27, and latch quarter-turn depressor 28. Furthermore, FIG. 7 manifests the key element in the securing means which is the deep, diamond-shape knurlings 14 that match the deep, diamond-shape knurlings 30 featured in the sidewall panel clip 5 illustrated in FIG. 9. FIG. 9 shows sidewall panel clip latching surface 31 that in FIG. 2 is demonstrated to being depressed by the upper latch pawl 6. FIG. 8 is the same as FIG. 7 with the alternative retaining means of using silicone pad 29.

Further important features of the present air grille attachment means include the following:

1. The air grille or equivalent panel has deep, diamond-shaped knurling with attachment means that secures the assembly onto a panel with a mating panel clip, the attachment means that has a ramp feature in the latch pawl applying pressure while in the latched position against the backside of the mating panel clip, the attachment means has released and latched positions limited by molded flat surface features, the attachment means has a molded stop that prevents over-latched position, the attachment means uses no special tool to 90-degree rotate the latch pawl to install onto a panel, the attachment means has deep, diamond-shape knurling engagement with the mating panel clip providing a mechanical and positive latch, the attachment means secures an air grille in variable locations, the attachment means uses the least amount of hardware, the attachment means has no exposed fastener, and the attachment means complemented by other edge clips.
2. The air grille has an elastomeric pad in lieu of the deep, diamond-shape knurling, a mating panel clip with deep, diamond-shape knurling depressing the resilient surface of the elastomeric pad in the system latched condition.
3. The attachment means is easily installable into the air grille, the attachment means is easily installable into the airi grille without additional hardware, the attachment means is easily installable into the air grille without any tool, the attachment means is easily removable from the air grille, and the attachment means is easily removable from the air grille without a tool.
4. A latch pawl having a flat surface and surface diagonally slanted in one corner to initiate application of pressure behind the mating panel clip as it is being turned clockwise into the latched position.
5. A latch pawl having a conical end surface for enabling easy insertion into the hub.
6. A latch pawl with a semi-annular flange enabling easy insertion into the hub and providing means of engagement with the semi-annular groove in the hub as the latch pawl is being turned.
7. A latch pawl with two flat areas oriented 90-degree to each other in the circumferencial shank enabling the part to stay in two functional positions within the hub.
8. A latch end with an hexagonal cavity enabling activation of the pawl.
9. Latch edges sized to be in contact with the stoppers in both latched and released position.

10. An internal hole in the hub with semi-annular grooves providing a female mating feature for the latch pawl.

11. A flat and slit area in the hub serving as a spring retainer for the two-position latch pawl.

12. An access hole in the front face of the hub enabling passage of an hexagonal tool to reach and actuate the latch pawl.

13. A mating panel clip with a stepped and sloping back surface allowing full contact of the latch pawl during the latching process.

14. A mating panel clip with deep, diamond-shape knurling matching the air grille equivalent knurling.

15. An elastomeric pad in the backside of the air grille providing resilient but positive contact with the mating panel clip.

The preceding and further advantages will appear to those skilled in the art upon a reading of the foregoing specification.

While the preferred embodiments of the invention have been illustrated and described, variations will be apparent to those skilled in the art. Accordingly, the invention is not to be limited to the specific embodiments illustrated and described, and the true scope of the invention is to be determined by reference to the following claims.

What is claimed is:

1. In combination:

a sidewall panel;

two panel clips attached to said sidewall panel;

an air grille assembly having an upper edge;

two releasable latch pawls for holding the upper edge of said air grille assembly against said sidewall panel;

said latch pawls retaining the air grille at floating locations;

a spring clip;

said grille having a lower edge;

said spring clip attached to the air grille with hook ends;

a floor angle attached on the aircraft floor; and said spring clip holding the lower edge of the air grille to said floor angle.

2. In combination:

a sidewall panel;

two panel clips attached to said sidewall panel;

an air grille assembly having an upper edge;

two releasable latch pawls for holding the upper edge of said air grille assembly against said sidewall panel;

said latch pawls retaining the air grille at varied locations; and, said latch pawl having a flat surface and surface diagonally slanted in one corner to initiate application of pressure behind the mating panel clip as it is being turned clockwise into the latched position.

3. In combination:

a sidewall panel;

two panel clips attached to said sidewall panel;

an air grille assembly having an upper edge;

two releasable latch pawls for holding the upper edge of said air grille assembly against said sidewall panel said latch pawls retaining the air grille at floating locations;

a spring clip;

said grille having a lower edge;

said spring clip attached to the air grille with hook ends;

a floor angle attached on the aircraft floor;

said spring clip holding the lower edge of the air grille to said floor angle; and, a second clip for interlocking the overlapping end of said grille to an adjacent grille by sandwiching said adjacent grille between the clip and the grille.

* * * * *